United States Patent [19]

Velzel et al.

[11] Patent Number: 4,850,673
[45] Date of Patent: Jul. 25, 1989

[54] OPTICAL SCANNING APPARATUS WHICH DETECTS SCANNING SPOT FOCUS ERROR

[75] Inventors: Christiaan H. F. Velzel; Henricus M. M. Kessels, both of Eindhoven, Netherlands

[73] Assignee: U. S. Philips Corporation, New York, N.Y.

[21] Appl. No.: 151,139

[22] Filed: Feb. 1, 1988

Related U.S. Application Data

[63] Continuation-in-part of Ser. No. 939,250, Dec. 8, 1986, Pat. No. 4,800,547.

[30] Foreign Application Priority Data

Nov. 23, 1987 [NL] Netherlands .................. 8702801

[51] Int. Cl.$^4$ .................. G02B 27/44; G11B 21/10
[52] U.S. Cl. .................. 350/162.17; 250/237 G; 369/45; 369/109; 369/112; 369/122
[58] Field of Search .................. 356/123; 350/162.17, 350/96.19; 250/237 G; 369/44, 45, 46, 109, 112, 120, 122

[56] References Cited

U.S. PATENT DOCUMENTS

| | | | |
|---|---|---|---|
| 3,108,383 | 10/1963 | Gabor | 350/162.17 |
| 3,482,107 | 12/1969 | Hock | 350/162.17 |
| 3,822,930 | 7/1974 | Douklias | 350/162.17 |
| 3,938,894 | 2/1976 | Nanba | 356/123 |
| 4,091,281 | 5/1978 | Willhelm et al. | 350/162.17 |
| 4,293,188 | 10/1981 | McMahon | 350/96.19 |
| 4,465,540 | 8/1984 | Albert | 350/162.17 |
| 4,771,411 | 9/1988 | Greve | 369/109 |

Primary Examiner—Rodney B. Bovernick
Assistant Examiner—Terry S. Callaghan
Attorney, Agent, or Firm—Algy Tamoshunas; Leroy Eason

[57] ABSTRACT

An apparatus for optically scanning a surface, such as the information surface of an optical record carrier. An error in focus of the scanning spot on the surface is detected by providing two gratings in succession in the path of the beam reflected from the surface. The grating periods of the two gratings are related in accordance with the nominal beam divergence at zero focus error, and the grating strips thereof are parallel but offset with respect to each other. A bounding line between detectors in a composite radiation-sensitive detection system extends parallel to the grating strips. An interference pattern of light and dark bands is projected by the second grating on the detection system, such pattern having an intensity distribution which varies with variations in focus error and can be enhanced by an appropriate value of the offset between the two gratings.

5 Claims, 2 Drawing Sheets

OPTICAL SCANNING APPARATUS WHICH DETECTS SCANNING SPOT FOCUS ERROR

This application is a continuation-in-part of pending U.S. application Ser. No 939,205, filed Dec. 8, 1986, now U.S. Pat. No. 4,800,547 assigned to the present assignee.

BACKGROUND OF THE INVENTION

1. Field of the Invention

The invention relates to an apparatus for optically scanning a surface of an object, which apparatus comprises a radiation source, an objective system for focussing a radiation beam supplied by the radiation source to form a radiation spot on the surface, and a focus error detection system for determining a deviation between the focal plane of the objective system and the surface.

An apparatus of this type is used, for example, when scanning an information plane of an optical record carrier for the purpose of reading recorded information in such plane by means of a read beam or for the purpose of writing information into such plane by means of a radiation beam which is intensity-modulated in conformity with the information to be written. Such an apparatus for scanning the surface of an object may also be used, for example, for measuring the surface height or the profile of the object.

DESCRIPTION OF THE RELATED ART

Apparatus for optically scanning a surface for the purpose of writing and/or reading optical record carriers have frequently been described in the literature and in patent specifications. By way of example, reference is made to U.S. Pat. No. 4,358,200 relating to a read apparatus.

In order to store a sufficiently large quantity of information, the details of the information structure in optical record carriers must have very small dimensions, of the order of micrometers, and the size of the scanning spot must be comparable with these dimensions. An objective system having a relatively large numerical aperture must be used for forming such a small scanning spot, which objective system must have a small depth of focus of the order of 10 micrometers. Deviations between the focal plane of the objective system and the information plane, also referred to as focus errors, might occur due to vibrations in the apparatus or wobbling of the record carrier, which deviations are larger than the depth of focus so that no reliable writing or reading is possible. Therefore it is necessary to detect the said deviation during scanning in order to correct the focussing in response thereto, for example, by displacing the objective system.

In an embodiment of the apparatus according to U.S. Pat. No. 4,358,200 a diffraction grating having a linearly varying grating period is arranged in the radiation path of the scanning beam, which grating renders the beam reflected from the record carrier and passing through the grating astigmatic. A radiation-sensitive detection system comprising four detectors is arranged between the astigmatic focal lines of this beam. Variations in the position of the information surface with respect to the objective system cause changes in the shape of the radiation spot formed on the detection system. This change of shape can be detected by combining the output signals of the detectors in the correct manner.

A special grating must be used in the known apparatus. Since this grating is both in the path of the projected beam and in the path of the reflected beam, only a portion of the scanning of the invention beam emitted by the source can be used. Moreover, stringent requirements are imposed on the accuracy of positioning the various components, notably the detector. Finally, the total path length of the beam, from the source to the detector, is relatively large.

The invention has for its object to mitigate these drawbacks by providing a scanning apparatus in which a different principle of focus error detection is utilized. This apparatus is characterized in that the focus error detection system comprises two diffraction gratings arranged one behind the other in the path of the beam reflected by the surface in the radiation spot, the grating period of the second grating being equal to that of the first grating multiplied by a factor which is determined by the nominal beam divergence of the reflected beam, and the faces of the gratings being arranged parallel to each other. The grating strips of the second grating are directed in the same direction as those of the first grating, but are offset with respect thereto in a direction transversely to the direction of the grating lines. A radiation-sensitive detection system comprising separate detectors is provided in which the bounding line of separation between the detectors is directed parallel to the grating lines.

The normal beam divergence is to be understood to mean the divergence of the reflected beam when the focal plane of the scanning beam coincides with the surface to be scanned.

A plurality of sub-beams which interfere with each other is formed by the gratings. Consequently, a pattern of dark and bright bands which may be considered as a superposition of the shadow images of the two gratings and in which the brightness distribution has an approximately sinusoidal variation is formed on the detection system. When the divergence of the beam changes, for example, due to a change of the distance between the objective system and the surface to be scanned, the image projected on the second grating by the first grating also changes. Consequently, the period and the brightness distribution of the interference pattern of dark and bright bands formed on the detection system will change with, for example, the focus error. By suitably arranging the separate detectors of the radiation-sensitive detection system and by suitably processing the output signals of these detectors, the magnitude and the sign of the focus error can be derived from the brightness pattern formed on the detection system.

The term beam divergence is to be understood to include negative beam divergence, i.e. beam convergence. The grating period of the second grating is larger than that of the first grating for a nominally diverging beam and the reverse applies to a nominally converging beam. The two gratings have an identical grating period in the case of a nominally parallel beam.

The grating periods, the distance between the gratings and the position of the detection system may be chosen to be such that only sub-beams of given diffreaction orders interfere with one another in the plane of the detection system.

However, the apparatus according to the invention is also preferably characterized in that the second grating is arranged in a Talbot image of the first grating. Its advantage is that a maximum number of diffraction orders takes part in the formation of the interference pattern and so provides maximum contrast after re-imaging on the detection system.

As described in the Article "Measurement of Phase Objects using the Talbot effect and Moiré techniques", in "Applied Optics" Vol. 23 (1984), pages 2296–2299, Talbot images of a grating with a period p which is irradiated by a monochromatic plane wave are formed at distances $z_k$ from this grating, in which $z_k = 2.k.p^2/\lambda$ wherein k is an integer and $\lambda$ is the wavelength of the radiation used. At the position at which k=1 the first Talbot image is produced. When k is an odd multiple of ½, a Talbot image is also produced, but with the bright and dark strips being interchanged.

It is to be noted that in the apparatus according to the said Article a first grating and a second grating placed in the Talbot image of the first grating are used for measuring the focal length of a lens. In such apparatus the directions of the grating lines in the two gratings extend at an angle to one another. Deviations between the focal plane of a lens system and a reflecting surface are not detected. The pattern formed by the two gratings is projected on a frosted glass plate for visual observation, and is not measured by means of a radiation-sensitive detection system comprising separate detectors. The said Article does not reveal the concept of the present invention according to which a system is provided with two gratings, which can be bulkmanufactured at low cost by repetitive techniques, and is eminently suitable for use in a product to be bulkmanufactured manufactured such as an apparatus for reading and/or writing an optical record carrier. Moreover, the system of the said article is sensitive to asymmetry errors (such as coma) in the objective system and to tilting of the gratings around the direction of the grating lines. When using such a system in a scanning apparatus for reading or writing an optical record carrier, crosstalk may be produced between the focus error signal and the tracking error signal when the orientation of the scanning apparatus and the direction of the track to be followed change with respect to each other during scanning. This occurs, for example, if the scanning apparatus is suspended from a pivotal arm.

A maximum sensitivity is obtained in an embodiment of an apparatus according to the invention in which the grating lines of the second grating are offset over one-fourth of the grating period with respect to the projection of the grating lines of the first grating. When the two gratings are positioned in this way, the gradient of the brightness distribution is as large as possible.

An advantage of the apparatus according to the invention is that the detection system can be placed close to the second grating so that the length of the radiation path can be reduced. An embodiment of the apparatus is therefore characterized in that the second grating is arranged against the radiation-sensitive detection system.

Another embodiment of the apparatus is characterized in that the radiation-sensitive detection system is formed as a grating-shaped detection system. In this embodiment the number of components is reduced to a minimum and the number of alignment steps during assembly is also minimum. When using a diode array as a combined grating and detection system, the range of focus error measurement of the apparatus can be made very large because the diodes can be read independently.

BRIEF DESCRIPTION OF THE DRAWINGS

The invention will now be described in greater detail, by way of example, with reference to the accompanying drawings in which.

Description of the Preferred Embodiments

Figure 1:
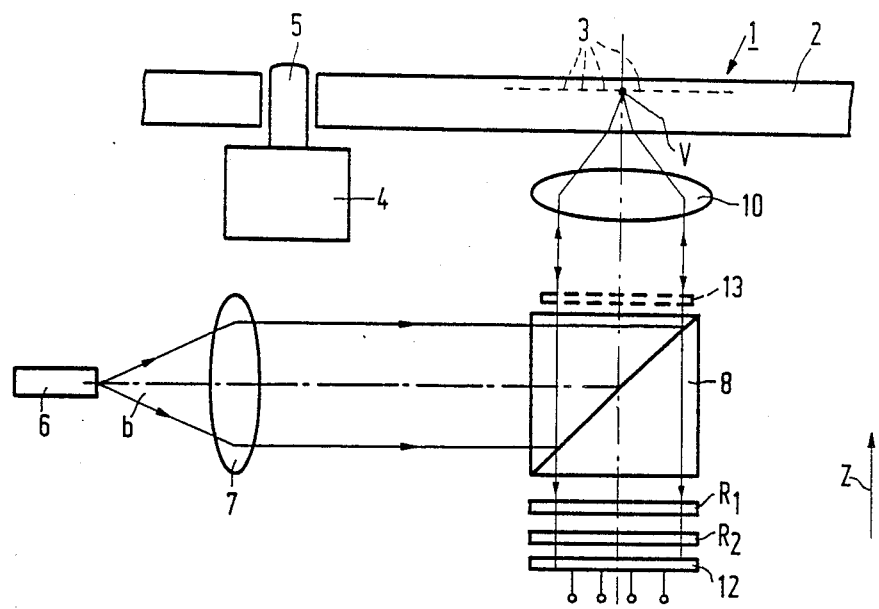
FIG. 1 shows an embodiment of a scanning apparatus for scanning an optical record carrier by means of the focus error detection system according to the invention.

FIG. 1 shows a circular disc-shaped record carrier 1 in a radiial cross-section. The information structure is indicated by information tracks 3 located in a reflective information surface 2. The information tracks comprise a large number of information areas, for example, which are not shown, which alternate with intermediate areas in the track direction. The record carrier is irradiated by a read beam b emitted by a radiation source 6, for example, a semiconductor diode laser such as an AlGaAs laser. A part of the beam b is reflected by a beam splitter 8 to the record carrier. An objective lens system 10, which is shown as a single lens for the sake of simplicity, focusses the read beam b to form a read spot V on the information surface 2. A collimator lens 7 is arranged between the radiation source 6 and the beam splitter 8, which lens converts the diverging beam into a parallel beam having a cross-section such that the pupil of the objective system is adequately filled so that the read spot V has minimum dimensions. The read beam is reflected by the information surface 2 and, if the record carrier is rotated by means of a shaft 5 driven by a motor 4, it is modulated in conformity with the information stored in a track to be read. A part of the modulated reflected beam is passed on to a radiation-sensitive detection system 12 which converts this beam into an electric signal representing the information which has been read.

The beam splitter 8 may be constituted by a semi-transparent mirror or a semi-transparent splitting prism. To minimize the radiation loss, a polarisation-sensitive splitting prism is preferably used as a beam splitter. A $\lambda/4$ polarizing plate 13, in which $\lambda$ is the wavelength of the beam, is then arranged in the radiation path between the splitting prism and the record carrier. This plate is traversed twice be the beam b, so that its direction of polarisation is rotated through a total of 90° and the beam, which is first substantially completely reflected by the prism 8, is substantially completely transmitted after reflection from the record carrier.

To detect possible deviations between the focal plane of the objective system 10 and the information surface 2, two gratings $R_1$ and $R_2$ are arranged between the beam splitter 8 and the radiation-sensitive detection system 12. In this case, in which the beam b is parallel, these gratings preferably have the same grating period. The grating strips of the two gratings are directed parallel to one another and are located substantially transversely to the direction of the track to be read.

Figures 2, 3A:
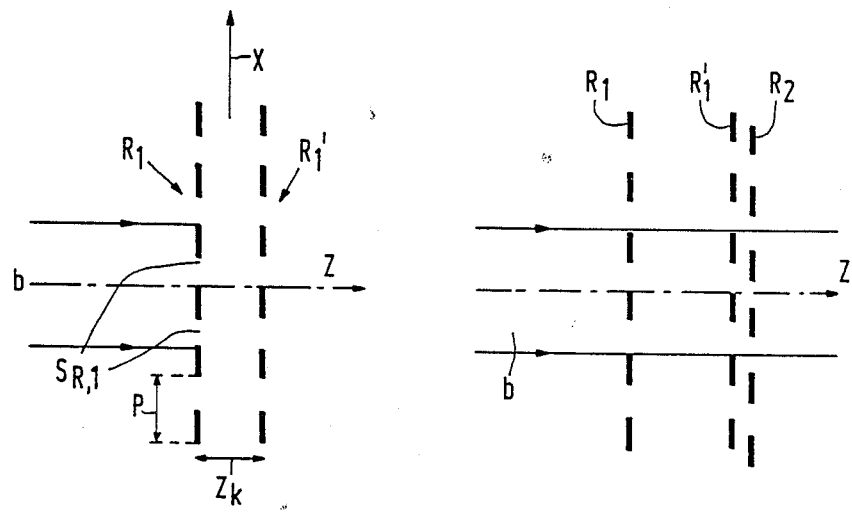
FIG. 2 shows a diffraction grating and a Talbot image thereof in a cross-section.
FIGS. 3a, 3b and 3c show the image focused on the second grating, and that such image is of the same size as the first grating with a parallel beam, an enlarged image of the first grating with a diverging beam, and a reduced image of the first grating with a converging beam, respectively.

FIG. 2 shows the first grating $R_1$ in a cross-section. In this Figure, is the direction of the optical axis. The grating strips $S_{R,1}$ extend perpendicularly to the plane of the drawing, or in the y direction, while the x-direction is the direction of the periodical amplitude or phase variation of the grating. If this grating is irradiated by a monochromatic beam having a plane wave front, a Talbot image of the grating is formed at a distance $z_k$, given by $z_k = 2.k.p^2/\lambda$, from the grating; in which k is an integer, in this case 1, p is the grating period and $\lambda$ is the wavelength of the incident beam. The said image is denoted by $R_1'$ in FIG. 2 and has the same period as the grating $R_1$ if the incident beam is parallel. Instead of an integer, k may alternatively be an odd multiple of $\frac{1}{2}$. In the images then formed the light and dark strips are interchanged with respect to the situation described.

Figure 3B:
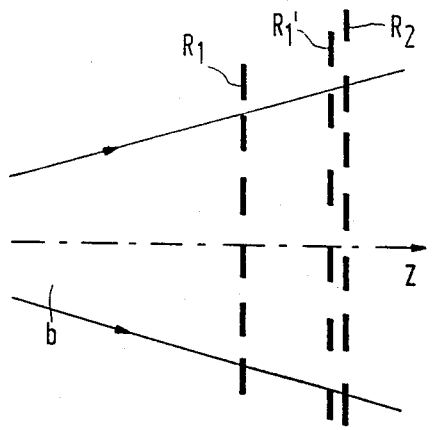
Figure 3C:
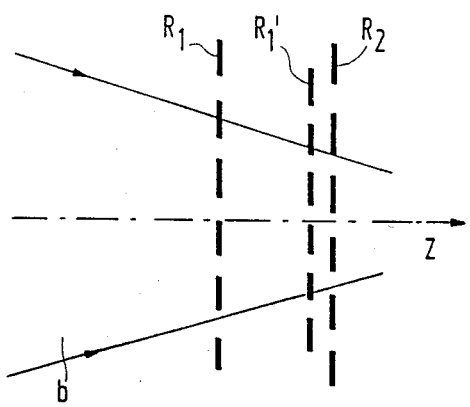

A second grating $R_2$ having, for example, the same grating period as the grating $R_1$ and having its grating strips in the y-direction directed parallel to those of the grating $R_1$ is placed at the location of the first grating image $R_1'$. A pattern of light and dark bands is then produced behind the grating $R_2$. The intensity distribution of this pattern in the x direction perpendicular to that of the grating lines is cosine-shaped in first order, which first-order approximation can be represented by:

$$I(x) = 1 + \cos\{(\Delta M \cdot x + x_0) \cdot 2\pi/p\},$$

in which $\Delta M$ is the relative difference in the period of the projected first grating and the second grating, $x_0$ is the offset of the two gratings with respect to each other and p is the period of the second grating. With reference to FIGS. 3a, 3b and 3c, the relative difference $\Delta M$ is the difference in the grating period of the projection $R_1'$ of the grating $R_1$ and the grating $R_2$. The value of $\Delta M$ is related to the distance $\Delta Z$ between the surface of the object and the focal plane of the objective system in accordance with $\Delta M = t \cdot \Delta Z/f^2$, in which t is the distance between the two gratings, $\Delta Z$ is the focus error and f is the focal length of the objective system.

If the information surface 2 coincides with the focal plane of the objective system 10, the beam from the surface to be scanned is a parallel beam after it has traversed the objective system, which beam is perpendicularly incident on the grating $R_1$. The grating period of the Talbot image $R_1'$ is then equal to the grating period of the first grating $R_1$ and so the relative difference $\Delta M$ between the periods of the projected grating and the second grating $R_2$, $\Delta M$, is zero. If a deviation occur in the distance between the information surface 2 and the focal plane, the beam incident on the grating $R_1$ will be converging at too large a distance, and will be diverging at too small a distance. The relative difference $\Delta M$ will then be negative or positive, respectively. For positive and negative values of x this gives rise to an increase or a decrease of the radiation intensity $I(x)$, provided that the absolute value of x is small. The sign and the extent of the intensity variation, increase or decrease, does not only depend on $\Delta M$ but also on the offset $x_0$ between the two gratings $R_1$ and $R_2$. The extent of variation is largest if the magnitude of the offset $x_0$ is equal to one-fourth or three-fourths of the grating period.

Figure 4:
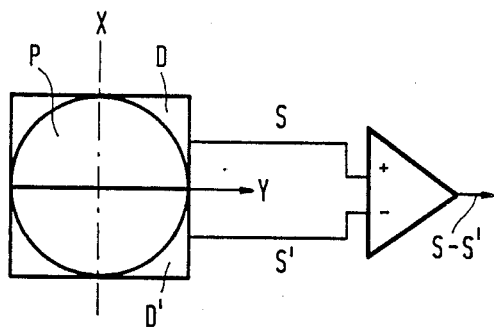
FIG. 4 shows a first embodiment of the radiation-sensitive detection system of the invention.

FIG. 4 shows a system for detecting the intensity variation due to a focus error, and comprises. Two detectors D and D' on which the pupil P of the beam is incident. The bounding line between the two detectors is indicated by the coordinate axis y and coincides with the line x=0. The bounding line is directed parallel to the grating lines of the gratings $R_1$ and $R_2$. If the output signals of the two detectors D and D' are denoted by the symbols S and S', respectively, the focus error signal is given by the difference between these two signals S—S'.

According to the invention an apparatus for scanning an optical record carrier by means of radiation having a wavelength of 800 nm may be formed, for example, with two gratings each having a grating period of 40 $\mu$m arranged at a distance of 2 mm from each other. For a wavelength of 800 nm this distance corresponds to the Talbot image at $k=\frac{1}{2}$. Two detectors of $2\times 4$ mm each together constituting a detection system with a surface of $4\times 4$ mm are arranged in the pupil of an objective lens having a focal length of 4 mm and a numberical aperture of 0.5.

Figure 5:
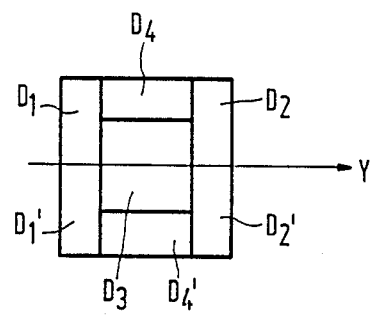
FIG. 5 shows another embodiment of such a radiation-sensitive detection system and FIG. 6 shows an embodiment of a radiation-sensitive detection system which is in the form of a grating.

FIG. 5 shows another embodiment of the detection system. The detection system is shown in a plan view and comprises seven separate detectors. The centre of the detection system comprises three detectors $D_4$, $D_3$ and $D_4'$ juxtaposed in the x direction and flanked on either side in the y direction by detectors $D_1$, $D_1'$, $D_2$ and $D_2'$. The output signals of the detectors $D_1$ and $D_2$ and those of the detectors $D_1'$ and $D_2'$ are coupled together. A focus error signal can be determined in an identical manner as described with reference to FIG. 4 by subtracting the combined output signal of the detectors $D_1'$ and $D_2'$ from the combined output signal of the detectors $D_1$ and $D_2$.

Similarly, the output signals of the detectors $D_3$, $D_4$ and $D_4'$ can be combined. If a different offset $x_0$ of the second grating with respect to the Talbot image of the first grating is chosen for the three last-mentioned detectors, a different dependence of the combined output signal on the focus error is realised. By suitably combining the two focus error signals, a tilt of the gratings around the y axis can be detected and a focus error signal can be generated which is independent of the tilt.

In the apparatus according to FIG. 1 the detection system is located close to the second grating so that the apparatus is compact. The second grating may be secured to the detection system so that this grating does not need a separate holder and precludes vibrations between this grating and the detection system. In an advantageous embodiment of the apparatus the second grating is integrated in the detection system 12. This system then comprises two separate detection sections each comprising an alternation of radiation-sensitive strips and radiation-insensitive strips. The apparatus then has one separate grating $R_1$ only, which may be secured to the beam splitter 8.

If desired, the detection system may also be placed at a larger distance from the gratings $R_1$ and $R_2$. The brightness pattern can then be imaged on the detection system by means of a lens arranged between the grating $R_2$ and the detection system.

Figure 6:
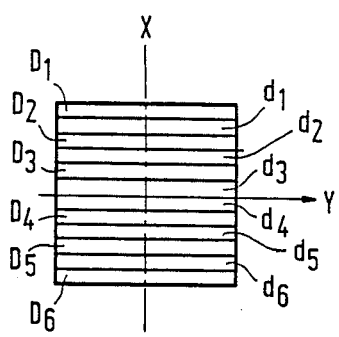

The radiation sensitivity may be further increased by forming the detection system as a grating-shaped detection system, for example, in the form of a diode array. Since the individual diodes from the array can be read independently, a large range of acceptance is possible. By suitably combining the diodes, in the form of two combs having meshing teeth, a high light sensitivity of the detection system is obtained because substantially all radiation passed by the first grating is detected. Such a detection system is shown diagrammatically in FIG. 6. The detection system comprises a plurality of first strips, six in the Figure, denoted by a capital letter D alternated by six second strips denoted by a small letter d. For the sake of readabiltiy the number of strips in the Figure is very limited with respect to a real grating. For a detector size of a few millimeters and a width of an individual detection strip of not more than several dozen μm a real grating comprises several hundred strips. When the output signals of the detectors $D_1, \ldots, D_6$ in FIG. 6 are denoted by $S_1, \ldots, S_6$ and by $s_1, \ldots s_6$ for the detectors $d_1, \ldots, d_6$, a focus error signal $S_f$ from the detectors $D_1, \ldots D_6$ is determined by $S_f=(S_1+S_2+S_3)-(S_4+S_5+S_6)$ and a focus error signal $s_f$ is determined by $s_f=(s_1+s_2+s_3)-(s_4+s_5+s_6)$. Due to the symmetric arrangement of the strips D and d with respect to line x=0, a reduction of the total intensity on the strips $D_1$, $D_2$ and $D_3$ (or $D_4$, $D_5$ and $D_6$) coincides with a corresponding increase of the intensity on the strips $d_1$, $d_2$ and $d_3$ (or $d_4$, $d_5$ and $d_6$). The focus error signals $S_f$ and $s_f$ thus have a reverse sign and may consequently be combined by subtracting them from each other: $S_f - s_f$.

The embodiment in which the second grating is arranged in the Talbot image of the first grating is advantageous because maximum use is then made of the radiation from the record carrier. However, it is alternatively possible to arrange the two gratings at a larger distance from each other and to use only some of the diffraction orders formed by the gratings for detecting a focus error signal. This possibility is shown diagrammatically in FIG. 7. The beam b incident on the grating $R_1$ is split by this grating into a plurality of sub-beams of different diffraction orders of which only the zero-order sub-beam b(0) and the two first-order subbeams b(+1) and b(-1) are shown. Each of these sub-beams is further split by the second grating $R_2$ into a plurality of diffraction orders which are denoted by the second indices in FIG. 6. Dependent on the grating periods and the distance between these gratings, sets of sub-beams such as b (0, +1) and b(+1,0) or b(0,-1) and b(-1,0) or b(+1, -1), b(0,0) and b(-1,+1) can be distinguished in a given plane $P_L$, with each set constituting an interference pattern. A detection system as shown in FIG. 4 may be arranged at the location of such a pattern. The brightness distribution in the strips of the brightness pattern is again dependent on the distance between the objective system 10 and the information surface 2.

Figure 7:
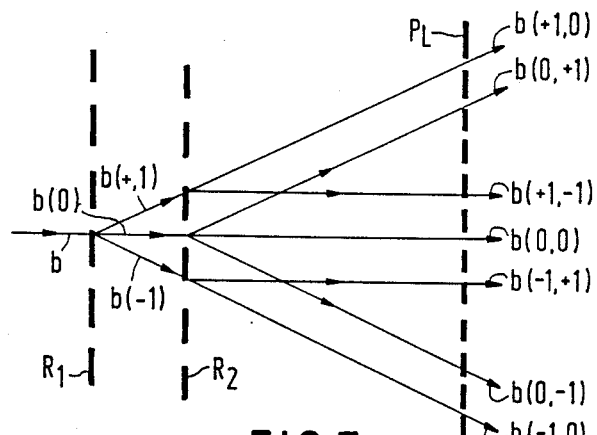
FIG. 7 shows two gratings and the diffraction orders formed thereby as are to be used in a further embodiment of the apparatus according to the invention.

It is to be noted that FIG. 7 only shows the chief rays of the beam b and of the sub-beams. Actually, each sub-beam has a width which is equal to that of the incident beam b.

The grating $R_1$ and $R_2$ may be amplitude gratings consisting of alternating radiation-transparent and radiation-absorbing or radiation-reflecting strips. However, phase gratings are preferably used which are transparent and whose juxtaposed strips are distinguished from one another in that they are located at a different height or in that they have different refractive indices. Profiled phase gratings can be bulk-manufactured at low cost by means of known replica techniques, once a so-called master phase grating is available, which renders these gratings very suitable for use in a bulk-manufactured product such as an optical read apparatus.

The invention may not only be used in an apparatus in which the beam b, in a well-focussed state, is a parallel beam before the first passage and after the second passage through the objective system 10. The beam b from the record carrier which has traversed the objective system may alternatively be a converging beam. In that case the period of the second grating is equal to a constant factor c multiplied by the period of the first grating, the factor c being determined by the convergence of the beam b in a well-focussed state. When a focus error occurs, this convergence changes and a change occurs again in the brightness distribution.

A focussing system as described hereinbefore may not only be used for scanning an optical record carrier or for determining a surface profile, but it may alternatively be used for performing, for example, measurements on lenses, or more generally, for determining the parallelism or divergence of a radiation beam.

What is claimed is:

1. An apparatus for optically scanning a surface of an object, comprising:

a radiation source for supplying a scanning beam of radiation;

an objective lens system for focusing said scanning beam to form scanning spot on said surface which produces a reflected beam therefrom, such reflected beam having a divergence which varies in accordance with deviations from correct focus of said radiation spot on said surface, such divergence having a nominal value corresponding to the correct focus; and a focus error detection system for detecting such deviations in focus of said radiation spot on said surface; characterized in that said focus error detection system comprises:

two planar diffraction gratings arranged in succession in the path of the reflected beam, the grating period of the second grating being equal to that of the first grating multiplied by a factor determined by said nominal divergence value of the reflected beam, the grating strips of the second grating being parallel to those of the first grating but offset with respect thereto transversely to the grating strips;

said first grating projecting an image thereof on the second grating having a grating period which varies with variations in the divergence of the reflected beam, and said second grating projecting an interference pattern of dark and light bands having a period and intensity distribution which varies in accordance with changes in the grating period of the projected image of said first grating; and at least two radiation-sensitive detectors on which the interference pattern projected by said second grating is formed, said detectors being separated by a bounding line there-between which extends parallel to said grating strips, said detectors producing signals corresponding to the intensity distribution of the interference pattern formed thereon.

2. An apparatus as claimed in claim 1, characterized in that the second grating is positioned in a Talbot image of the first grating.

3. An apparatus as claimed in claim 1, or claim 2, characterized in that the grating strips of the second grating are offset at least one-fourth of the grating period thereof with respect to the grating strips of the image of the first grating projected on the second grating.

4. An apparatus as claimed in claim 1 or 2, characterized in that the second grating is positioned against the radiation-sensitive detectors.

5. An apparatus as claimed in claim 1 or 2, characterized in that said radiation-sensitive detectors and said gratings are combined as a composite grating-shaped detection system.

* * * * *